United States Patent
Heimer et al.

(10) Patent No.: US 11,885,717 B2
(45) Date of Patent: Jan. 30, 2024

(54) METHOD AND APPARATUS FOR HERMETICITY TEST

(71) Applicant: Solaredge Technologies Ltd., Herzeliya (IL)

(72) Inventors: Yuval Heimer, Shoham (IL); Reuven Savitzky, Hod HaSharon (IL)

(73) Assignee: Solaredge Technologies Ltd., Herzeliya (IL)

( * ) Notice: Subject to any disclaimer, the term of this patent is extended or adjusted under 35 U.S.C. 154(b) by 213 days.

(21) Appl. No.: 17/481,410

(22) Filed: Sep. 22, 2021

(65) Prior Publication Data

US 2022/0074805 A1    Mar. 10, 2022

Related U.S. Application Data

(63) Continuation of application No. 16/403,696, filed on May 6, 2019, now Pat. No. 11,156,527, which is a continuation of application No. 15/434,322, filed on Feb. 16, 2017, now Pat. No. 10,337,948.

(60) Provisional application No. 62/296,885, filed on Feb. 18, 2016.

(51) Int. Cl.
    *G01M 3/32*      (2006.01)

(52) U.S. Cl.
    CPC ........ *G01M 3/3209* (2013.01); *G01M 3/3272* (2013.01)

(58) Field of Classification Search
    CPC .......... G01M 3/02; G01M 3/26; G01M 3/229
    See application file for complete search history.

(56) References Cited

U.S. PATENT DOCUMENTS

| | | |
|---|---|---|
| 3,048,498 A | 8/1962 | Marsh |
| 3,759,605 A | 9/1973 | Johnson |
| 4,494,402 A | 1/1985 | Carney |
| 4,574,620 A | 3/1986 | Cohl |
| 4,729,583 A | 3/1988 | Lalikos et al. |
| 4,771,630 A | 9/1988 | Croce et al. |
| 5,173,375 A | 12/1992 | Cretzmeyer et al. |
| 5,305,031 A | 4/1994 | Hayakawa |
| 5,548,993 A | 8/1996 | Alexander |
| 5,762,095 A * | 6/1998 | Gapinski ............ F16K 15/20 137/231 |
| 6,032,607 A | 3/2000 | Ashline |
| 6,276,391 B1 * | 8/2001 | Wu ................. F16K 13/04 285/354 |

(Continued)

FOREIGN PATENT DOCUMENTS

| | | | |
|---|---|---|---|
| CN | 2124360 U | * | 12/1992 |
| CN | 2249689 Y | * | 3/1997 |

(Continued)

OTHER PUBLICATIONS

Presaflator Owner's Manual, Prestacycle, Inc., available on the internet at https://web.archive.org/web/20121018102509/http://www.prestacycle.com/docs/Prestaflator_manual.pdf (Year: 2012).*

(Continued)

*Primary Examiner* — David A. Rogers
(74) *Attorney, Agent, or Firm* — Banner & Witcoff, Ltd.

(57) ABSTRACT

An apparatus includes an enclosure designed to house electronics and a ventilation plug fastened to an exterior of the enclosure, the ventilation plug being adapted for field testing hermeticity.

20 Claims, 12 Drawing Sheets

(56) References Cited

U.S. PATENT DOCUMENTS

| | | | |
|---|---|---|---|
| 6,349,025 B1 | 2/2002 | Fraley et al. | |
| 6,593,026 B1 | 7/2003 | Tukawaki et al. | |
| 6,651,486 B1 | 11/2003 | Johnson et al. | |
| 6,813,934 B2 | 11/2004 | Kang | |
| 7,185,529 B2 | 3/2007 | Ball et al. | |
| 7,293,549 B2 | 11/2007 | Kaishio | |
| 7,509,841 B2 | 3/2009 | Spaolonzi et al. | |
| 7,581,426 B2 | 9/2009 | Gilday | |
| 7,624,624 B2 | 12/2009 | Meskouri et al. | |
| 7,841,229 B2 | 11/2010 | Ridgway et al. | |
| 8,245,722 B2 * | 8/2012 | Huang | F04B 33/005 137/231 |
| 8,360,090 B2 * | 1/2013 | Wang | F16K 11/056 137/119.06 |
| 8,402,987 B2 * | 3/2013 | Wang | B60S 5/043 251/149.1 |
| 8,408,047 B2 | 4/2013 | McCollom | |
| 8,727,844 B2 | 5/2014 | Furuyama et al. | |
| 8,757,194 B2 * | 6/2014 | Huang | B60C 29/06 152/415 |
| 8,821,226 B2 | 9/2014 | Yano et al. | |
| 8,881,931 B2 | 11/2014 | Chiu | |
| 9,274,019 B2 | 3/2016 | Bean, Jr. et al. | |
| 9,327,134 B2 | 5/2016 | Greiner et al. | |
| 9,752,951 B2 | 9/2017 | Parker et al. | |
| 9,759,337 B2 * | 9/2017 | Cassiman | F16K 15/20 |
| 9,831,531 B2 | 11/2017 | Tsukui | |
| 9,855,928 B2 * | 1/2018 | Currie | F04B 33/005 |
| 9,869,603 B2 | 1/2018 | Parker et al. | |
| 10,288,519 B2 | 5/2019 | De La Cruz | |
| 2002/0027484 A1 | 3/2002 | Stevenson et al. | |
| 2003/0027169 A1 | 2/2003 | Zhang et al. | |
| 2003/0047562 A1 | 3/2003 | Wu et al. | |
| 2006/0023397 A1 | 2/2006 | Brendel | |
| 2006/0180125 A1 | 8/2006 | Kaishio | |
| 2008/0216560 A1 | 9/2008 | Ridgway et al. | |
| 2008/0271789 A1 * | 11/2008 | Huang | F16L 29/00 137/231 |
| 2009/0047890 A1 | 2/2009 | Yano et al. | |
| 2010/0011839 A1 | 1/2010 | Browning | |
| 2010/0227544 A1 | 9/2010 | Furuyama et al. | |
| 2011/0126613 A1 | 6/2011 | Lin et al. | |
| 2011/0199220 A1 | 8/2011 | McAlister | |
| 2012/0067109 A1 | 3/2012 | Kenney et al. | |
| 2012/0168453 A1 | 7/2012 | Chiu | |
| 2012/0204973 A1 * | 8/2012 | Wang | F16K 11/056 137/382 |
| 2013/0012117 A1 | 1/2013 | Uemura et al. | |
| 2013/0031961 A1 | 2/2013 | Nandwani et al. | |
| 2014/0165708 A1 | 6/2014 | Konrath et al. | |
| 2014/0290489 A1 | 10/2014 | Uemura et al. | |
| 2015/0207182 A1 | 7/2015 | Tsukui | |
| 2018/0045349 A1 * | 2/2018 | Wang | F16L 37/38 |

FOREIGN PATENT DOCUMENTS

| | | | | |
|---|---|---|---|---|
| CN | 101738295 A | | 6/2010 | |
| CN | 102098891 A | | 6/2011 | |
| CN | 103237229 A | | 8/2013 | |
| CN | 103389191 A | | 11/2013 | |
| DE | 102013211400 A1 | | 12/2014 | |
| EP | 0377067 A1 | | 7/1990 | |
| EP | 1625373 A1 | | 2/2006 | |
| GB | 292819 A | * | 6/1928 | |
| GB | 2442341 A | * | 4/2008 | B60G 17/0528 |
| JP | 07139676 A1 | | 5/1995 | |
| JP | 2002350280 A | | 12/2002 | |

OTHER PUBLICATIONS

Prestacycle, Inc., available on the internet at https://web.archive.org/web/20121030102809/https://www.prestaflator.com/#a (Year: 2012).*

Jun. 26, 2017—European Search Report—EP 17156754.

Feb. 3, 2020—CN Office Action—CN 201110083987.1.

Jul. 14, 2020—European Search Report—EP Application 20159809.1.

* cited by examiner

METHOD AND APPARATUS FOR HERMETICITY TEST

CROSS REFERENCE TO RELATED APPLICATIONS

The present application is a continuation of U.S. application Ser. No. 16/403,696 filed May 6, 2019, which is a continuation of U.S. application Ser. No. 15/434,322 filed Feb. 16, 2017, now U.S. Pat. No. 10,337,948, which claims benefit to U.S. Provisional Patent Application No. 62/296,885 filed Feb. 18, 2016, the contents of which are incorporated herein by reference in their entireties.

BACKGROUND

Waterproofness (i.e. hermetic sealing, or hermeticity) may be a desirable characteristic of various devices. For example, it is sometimes desirable to waterproof electrical devices which are designed to be deployed outdoors for extended periods of time, or devices which are commonly exposed to humidity or water. Waterproofing is especially desirable with regard to electrical devices which process significant electrical power, since water influx to such devices may cause system failure, blackouts, electrical fires or other life-threatening situations. Such devices include photovoltaic (PV) direct-current to alternating-current (DC-to-AC) inverters, direct-current to direct-current (DC-to-DC) converters, PV combiner boxes, PV safety devices (e.g. residual current detectors) and more.

One of the challenges of waterproofing devices is testing the hermeticity of the device enclosure. Commonly used methods include removing a sealing plug from the device enclosure, injecting pressurized air into the enclosure, monitoring air pressure within the enclosure for a period of time, and returning the plug. When many devices are being testing for hermeticity at once (e.g. on a manufacturing or assembly line), the number of required steps and reliance on human skill may cause some tests to be carried out incorrectly, or sealing plugs to be improperly returned to place. Therefore, a need remains for an improved method for hermeticity testing.

SUMMARY

The following summary is a short summary of some of the inventive concepts for illustrative purposes only, and is not intended to limit or constrain the inventions and examples in the detailed description. One skilled in the art will recognize other novel combinations and features from the detailed description.

Embodiments herein may employ an apparatus for injecting pressurized air into an enclosure through a vent adapted to field test hermeticity. In some embodiments, the vent may be attached to the enclosure and configured to maintain thermal or air-pressure equilibrium inside the enclosure. In accordance with embodiments herein, pressurized air may flow through the vent in various ways. In some embodiments, a vent may comprise a membrane which allows air to flow bidirectionally (e.g. a Gore-Tex™ membrane). In some embodiments, pressurized air may flow through a vent membrane into an enclosure. In some embodiments, additional airways may bypass a membrane to carry air into an enclosure.

In some embodiments, a method of hermeticity testing may allow an external device to be easily connectable and disconnectable to the vent, with the device configured to inject pressurized air into the enclosure via the vent, and configured to monitor air pressure in the enclosure. In some embodiments, a hermeticity test might not require removal and/or reinsertion of a vent or plug, and may reduce the risk of a testing procedure being carried out improperly due to human error. In some illustrative embodiments, illustrative methods of hermeticity-testing may be carried out manually or automatically during manufacturing. In some embodiments, apparatuses and methods disclosed herein may allow periodic hermeticity-tests to be carried out safely and easily while enclosed device are deployed in the field, either as part of periodic maintenance or in response to indications of a potentially unsafe condition (e.g. loss of enclosure hermeticity).

In some embodiments, an adapter may be provided that includes a first section configured to connect to a tube and a second section configured to fasten to a ventilation plug attached to an enclosure. The adapter may be designed to receive gas from the tube and transfer the gas to the ventilation plug. In some examples, the adapter may include a sealing device configured to seal the adapter to a ventilation plug. The sealing device may include an O-ring. The adapter may further include an airway through the first and second sections configured to transfer gas from the tube to the ventilation plug. A cable gland may be included to connect to the tube. In some examples, the adapter may include a protrusion protruding from the second section and designed to fit into a corresponding cavity in a ventilation plug. In some examples, the adapter may include a cavity in the second section designed to receive a corresponding protrusion in a ventilation plug.

As noted above, this summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

It is noted that various connections are set forth between elements herein. These connections are described in general and, unless specified otherwise, may be direct or indirect; this specification is not intended to be limiting in this respect. Further, elements of one embodiment may be combined with elements from other embodiments in appropriate combinations or subcombinations. By way of non-limiting example, the threaded plug of the ventilation plug ("vent") illustrated in FIG. 3 may be combined with the small air passageways of the vent illustrated in FIG. 4.

Figure 1:
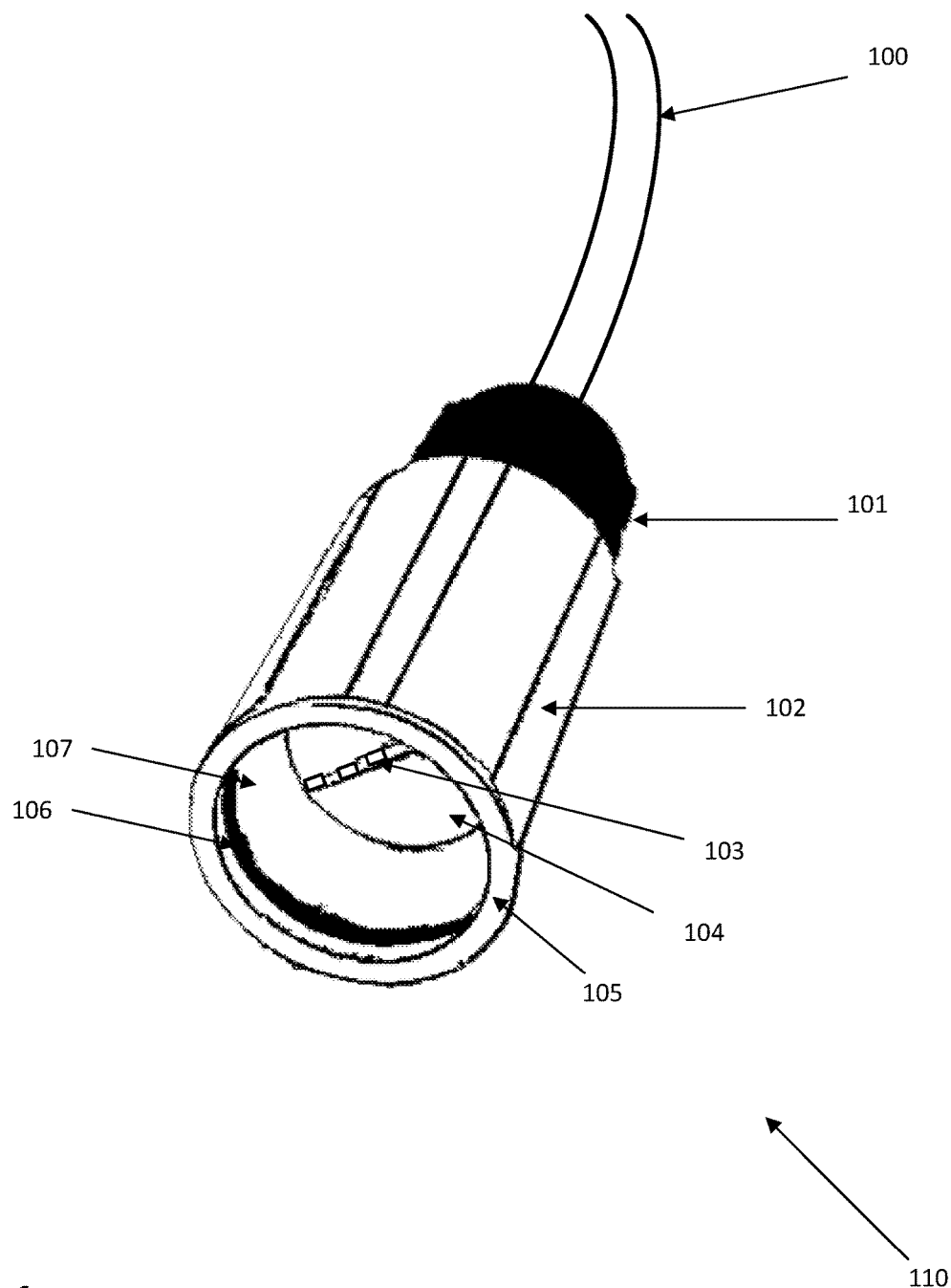
FIG. 1 illustrates an adapter according to various aspects of the present disclosure.
Figure 2:
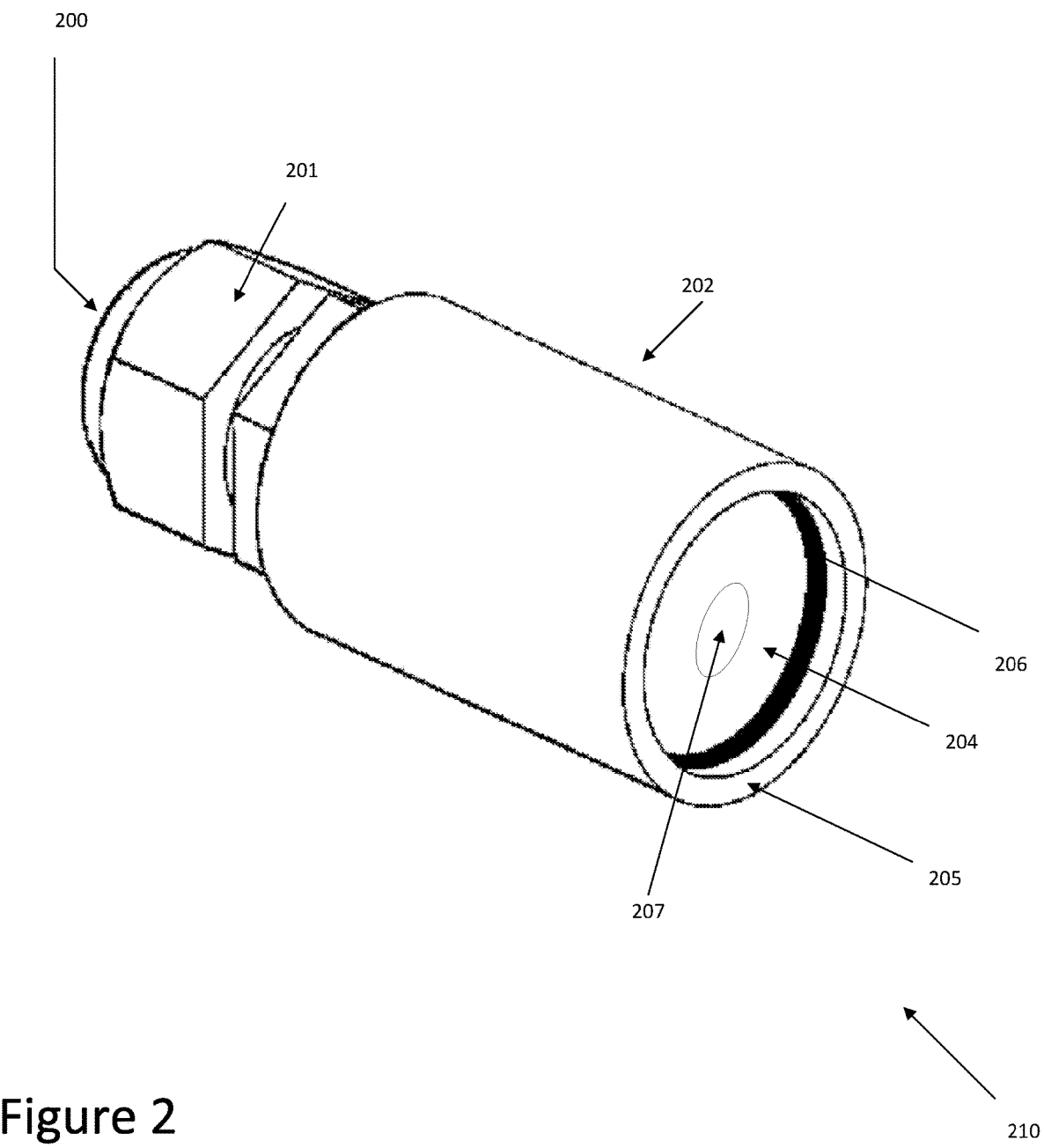
FIG. 2 illustrates an adapter according to various aspects of the present disclosure.

Reference is now made to FIG. 1, which shows an adapter according to an illustrative embodiment. Adapter 110 may comprise cable gland 101, outer casing 102, inner assembly 104, O-ring 106 and outer lip 105. Chamber 107 may be formed by the connecting the adapter components. Adapter 110 may be used to carry out hermeticity tests according to exemplary embodiments. Pressure hose 100 may be connected adapter 110 via cable gland 101, and may be connected at the other end (not shown explicitly) to an appropriate source of pressurized air, such as an air tank. Pressure hose 100 may be made of a suitable material, for example, rubber plastic or steel. Cable gland 101 may also be made of a suitable material, for example, rubber, plastic or steel. Cable gland 101 may attach pressure hose 100 to inner assembly 104. Inner assembly 104 may comprise air ducts or air exitways to allow air to flow into chamber 107. In some embodiments, string of air ducts 103 allow air to flow from the inner assembly into chamber 107. In some embodiments air ducts may be scattered across the surface of inner assembly 104, and/or located on the sides of inner assembly 104, adjacently to outer casing 102. In some embodiments, the surface of inner assembly 104 facing chamber 107 may be designed to allow the inner assembly to be pressed tightly against a corresponding surface. In some embodiments, the surface of inner assembly 104 might not be required to fit tightly against a corresponding surface. In some embodiments, the surface of inner assembly 104 may include elements designed to form a mechanical connection to a corresponding surface, such as protrusions, cavities or clasps configured to connect with corresponding cavities, protrusions or clasps. O-ring 106 may line an inner wall of outer casing 102, and may be designed to form an airtight chamber when the cavity of outer casing 102, forming chamber 107, is fit over a corresponding protrusion such as a ventilation plug. For example, O-ring 106 may be fit over a gripping section of a vent (e.g. gripping section 301 of FIG. 3, gripping section 401 of FIG. 4) to form an airtight seal between adapter 110 and the vent. Outer lip 105 may, in some embodiments, be pressed against the wall of an enclosure when fastening adapter 110 to a vent connected to an enclosure. In some embodiments, outer casing 102 may be of an essentially cylindrical shape, and in some embodiments, smooth portions may run along the external sides of outer casing 102, to allow easier gripping of the casing. The various parts of adapter 110 may be made of suitable materials. For example, outer casing 102 and inner assembly 104 may be made of metal or plastic. O-ring 106 may be made of rubber or a similarly sealing material, Reference is now made to FIG. 2, which shows an adapter according to an illustrative embodiment. Adapter 210 may include cable gland 201, outer casing 202, inner assembly 204, O-ring 206 and outer lip 205. Cable gland 201 may comprise opening 200 for insertion of an air tube (not illustrated explicitly). The various components of adapter 210 may be similar to those described with regard to adapter 110 in FIG. 1. In the embodiment illustrated in FIG. 2, outer casing 202 may be cylindrical and smooth. In some embodiments, the outer surface of inner assembly 204 comprises cavity 207, designed to hold a corresponding protrusion such as protrusion 409 illustrated in FIG. 4. The coupling of a cavity with a protrusion may be done to ensure a full connection between adapter 210 and a corresponding vent such as vent 400 illustrated in FIG. 4. For example, usage instructions for adapter 210 may include specifying to align cavity 207 with protrusion 409 of FIG. 4, and to push adapter 210 over vent 400 of FIG. 4 until outer lip 205 reaches a certain point, such as the external wall of an enclosure hold the vent or a visual mark along the side of the vent. Failure of outer lip 205 to reach a certain point may indicate an incomplete connection of an adapter to a vent. In some embodiments, outer lip 205 may include a slight ring extending inwards, designed to fit over a gripping section of a vent (e.g. gripping section 301 of FIG. 3, gripping section 401 of FIG. 4), and designed to make a clicking sound when being inserted over the gripping section. In some embodiments, failure to hear a clicking sound when inserting adapters similar to adapter 410 over a vent may indicate a faulty connection between the parts.

Figure 3:
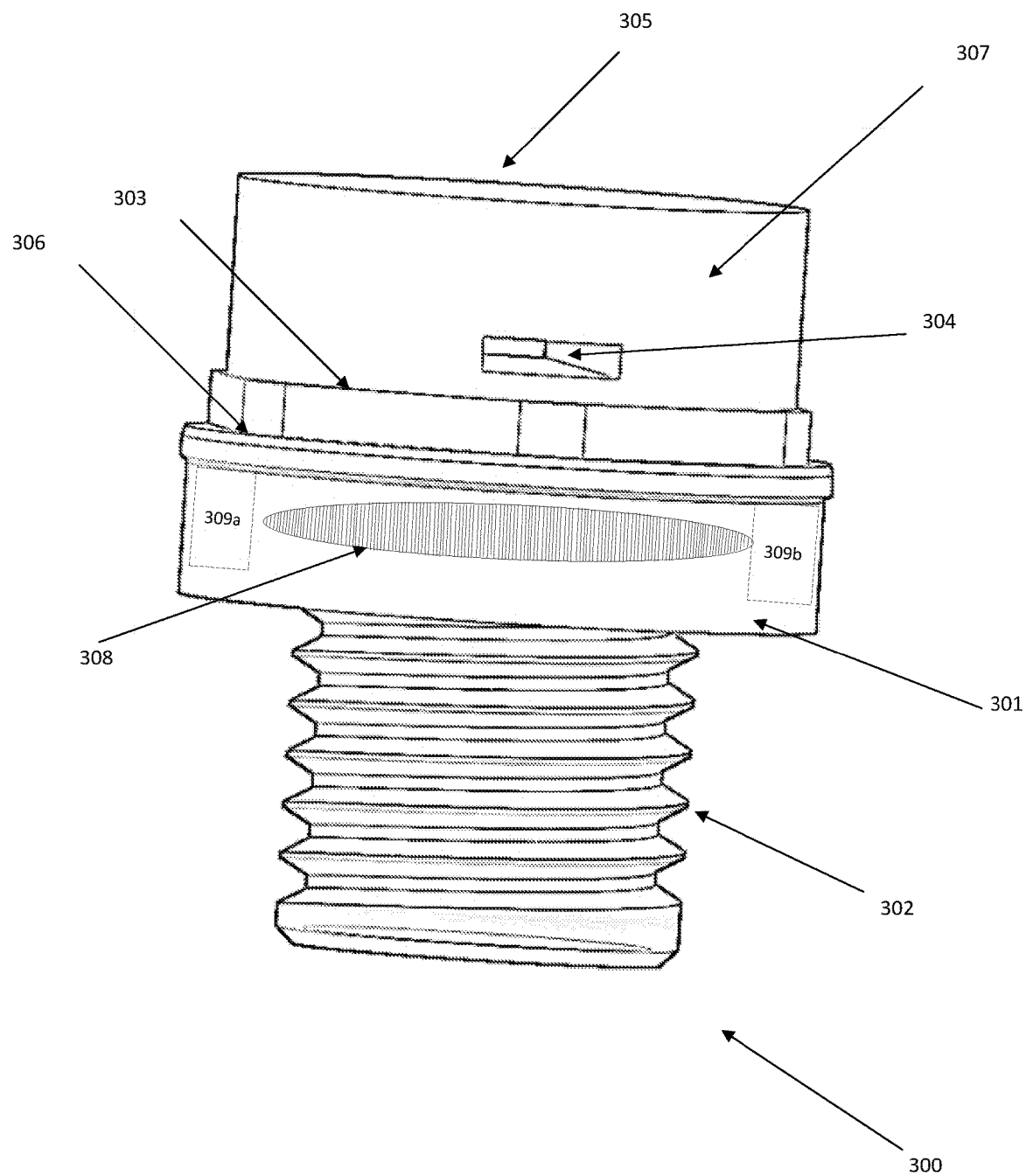
FIG. 3 illustrates a ventilating plug according to various aspects of the present disclosure.

Reference is now made to FIG. 3, which illustrates a ventilating plug (vent) according to an embodiment. Vent 300 may comprise fastening tube 302, designed for fastening the vent to an enclosure. In the illustrative embodiment shown in FIG. 3, fastening tube 302 comprises external threading, for screwing the vent into an internal threading on the enclosure. Fastening tube 302 may be made of an appropriate material such as plastic or steel. In some embodiments, the threading might not be necessary. For example, in some embodiments the fastening tube may be made of rubber, and may be fastenable to an enclosure by forcing the fastening tube into a correspondingly sized hole in the enclosure for a tight connection. Fastening tube 302 may be hollow or may comprise an airway through the tube, to allow air to flow in either direction. Fastening tube 302 may be connected to gripping section 301. Gripping section 301 may be cylindrical, and may be designed to allow a cylindrical casing of slightly larger circumference to be tightly connected over it. In some embodiments, gripping section 301 may be hollow or may contain a hole, forming an airway to allow air to flow in either direction. In some embodiments, gripping section 301 may further comprise vent filter 308 at one end of the airway, which may prevent dust and moisture from passing through the vent. Vent filter 308 may comprise a membrane made of Gore-Tex™, fabric, plastic, PTFE or a different appropriate material. Vent filter 308 may be designed to allow air to flow bidirectionally, while preventing moisture and/or dirt from passing through. Vent filter 308 may be rated to withstand air pressure such as 100, 200, 500 or 1000 mbar without rupturing. In some embodiments, vent filter 308 may be located in in fastening tube 302, gripping section 301, flange 306, nut 303 or outer section 307. In some embodiments, gripping secion 301 may further include bypass airpaths 309a and 309b, allowing air to bypass vent filter 308 during testing conditions. Flange 306 may connect nut 303 to gripping section 301, with nut 303 designed to be gripped by a wrench for screwing in vent 300. Some embodiments might not include flange 306 and/or nut 303. For example, if fastening tube 302 is fastenable without using screwing action, vent 300 might not include flange 306 and/or nut 303. Outer section 307 may be connected to nut 303. In embodiments not featuring a nut or flange, outer section 307 may be directly connected to gripping section 301. Outer section 307 may include entryway 304, to allow air to enter and exit the vent 300. An airway may exist between entryway 304 and the vent filter 308. In some embodiments, the vent filter may be inside gripping section 301, between entryway 304 and the airway passing through gripping section 301 and fastening tube 302. Surface 305 may form the top of vent 300, and may be shaped to fit closely against a section of an adapter for hermeticity testing. For example, surface 305 may be smooth, to fit closely against a similarly smooth surface. In some embodiments, surface 305 may include protrusions and/or cavities, designed to fit together with corresponding cavities and/or protrusions on a corresponding device. The various parts of vent 300 may be made of suitable materials, such as plastic or metal. In some embodiments, rubber may be used for some sections.

Figure 4:
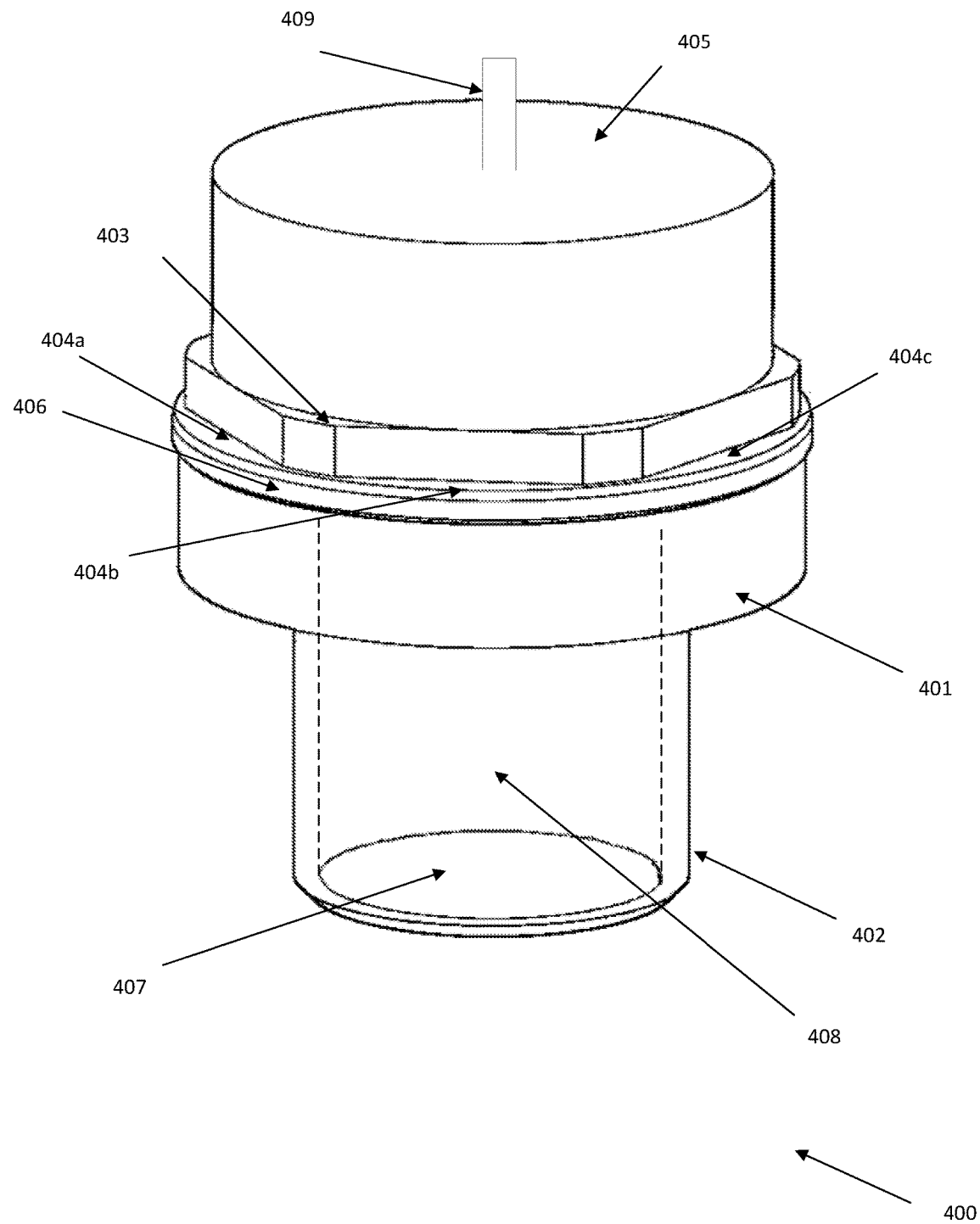
FIG. 4 illustrates a ventilating plug according to various aspects of the present disclosure.

Reference is now made to FIG. 4, which illustrates a ventilating plug (vent) 400 according to an embodiment. Vent 400 may comprise similar parts to those illustrated in FIG. 3. Fastening tube 402 might not include threading, and may be fastened to an enclosure by forcing the fastening tube into a correspondingly sized hole in the enclosure for a tight connection. Fastening tube 402 is illustrated in a transparent manner, to show air path 408 and air exit way 407. Gripping section 401 may comprise a section of air path 408. Air may enter air path 408 via ducts 404a, 404b and 404c. Similar ducts may be placed in other locations on flange 406, or in suitable location on outer section 405. Outer section 405 might not include a large entryway similar to entryway 304 of FIG. 3. Outer section 405 may include protrusion 409, designed to fit into a corresponding cavity on an adapter designed to fit smoothly against outer section 405. Vent 400 may include additional features similar to those discussed with regard to the vent 300, such as vent filter 308. In some embodiments, vent 400 may further comprise an O-ring disposed around gripping section 401 or outer section 405 for sealing against a corresponding adapter. In some embodiments, a corresponding adapter may be configured to be tightened around an O-ring featured by a vent (e.g. vent 400 or vent 300).

Figure 5:
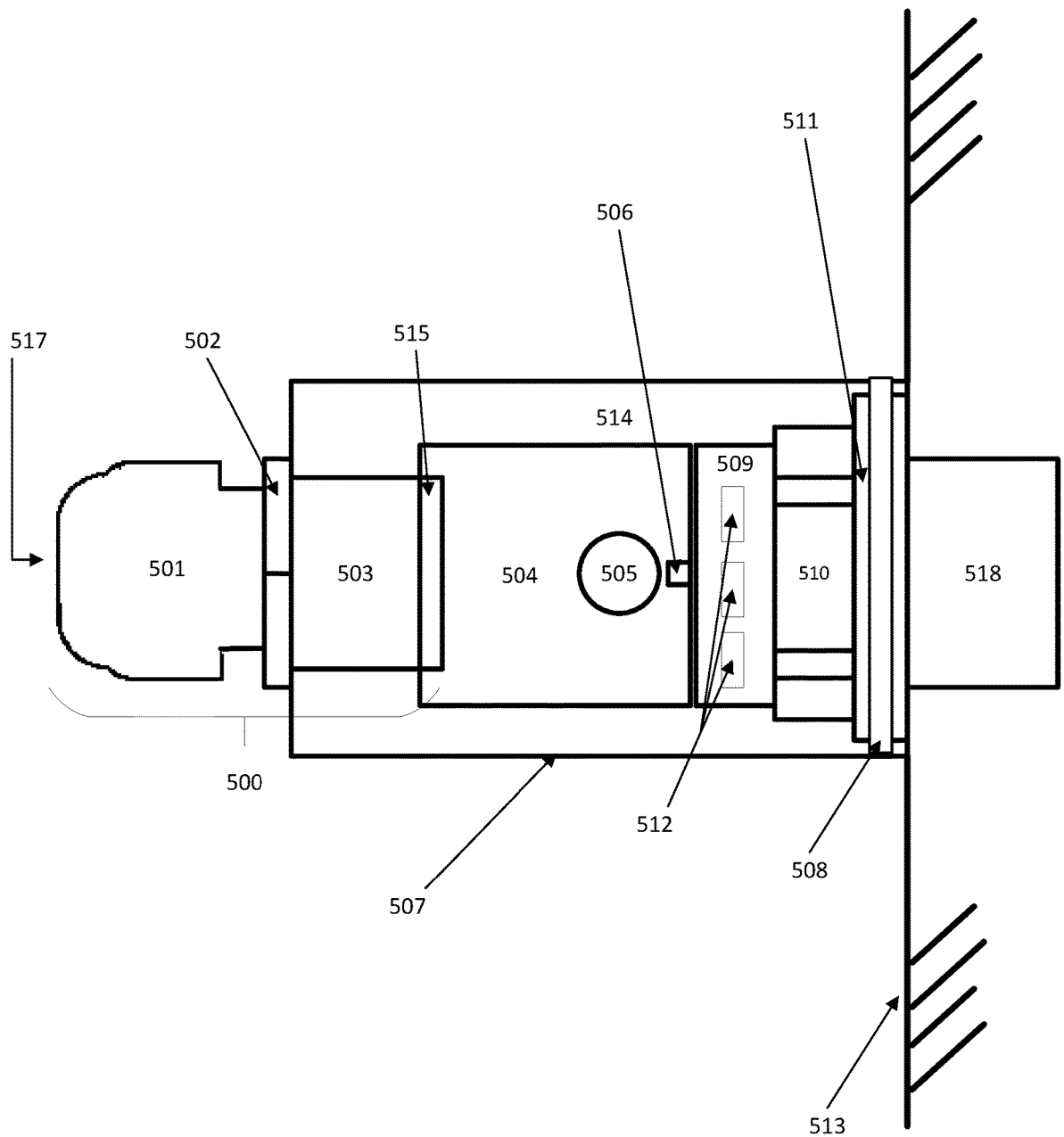
FIG. 5 illustrates interconnected hermeticity-testing elements according to various aspects of the present disclosure.

Reference is now made to FIG. 5, which illustrates a combined hermeticity-testing apparatus according to some embodiments. A cable gland used in conjunction with illustrative elements may be similar to cable glands 101 and 201 illustrated in FIGS. 1 and 2, respectively. The cable gland 500 may comprise cable gland head 501, nut 502 and fastening section 503. Nut 502 may be used to help tighten fastening section 503 into outer casing 507. In some embodiments, fastening section 503 may include exterior threading, and may be screwed into corresponding interior threading at the opening of outer casing 507 and/or corresponding interior threading at entry point 515 of inner assembly 504. Cable gland head 501 may include an entry point 517, for insertion of a tube, and the cable gland may be configured to allow air to flow into entry point 517, through cable gland head 501, through nut 502, through fastening section 503 and into inner assembly 504. An illustrative adapter may be similar to the adapters 110 and 210 illustrated in FIGS. 1 and 2, respectively. An illustrative adapter may comprise outer casing 507, inner assembly 504, exit hole 505, and O-ring 508. Inner assembly 504 may include exit hole 505, to allow air to flow from inner assembly 504 into chamber 514. In the illustrative embodiment shown in FIG. 5, inner assembly 504 further includes a cavity for holding protrusion 506 protruding from the surface of a vent. Outer casing 507 may house the inner assembly 504, and may form the walls of chamber 514. O-ring 508 may be disposed along the wall of outer casing 507, and may be designed to tightly seal the chamber when outer casing 507 is fit over gripping section 511 of a vent. An illustrative vent may be similar to the vents 300 and 400 illustrated in FIGS. 3 and 4, respectively. An illustrative vent may comprise outer section 509, nut 510, and gripping section 511, and fastening tube 518. Outer section 509 may comprise air ducts 512, to allow air to flow from chamber 514 into the vent during a hermeticity test, and/or to allow air to escape via the vent during regular operation of the vent after a test is complete. Outer section 509 may further comprise protrusion 506 for fitting into a corresponding cavity on inner assembly 504, to ensure proper connection of the components, as detailed above. The vent may be fastened to an enclosure 513 during assembly, by inserting fastening tube 518 into enclosure 513. Fastening tube 518 may comprise external threading, for screwing the vent into an internal threading on enclosure 513. In some embodiments, the threading might not be necessary. For example, in some embodiments fastening tube 518 may be made of rubber, and may be fastenable to enclosure 513 by forcing the fastening tube into a correspondingly sized hole in the enclosure for a tight connection. Fastening tube 518 may be hollow, or may comprise an airway through the tube, to allow air to flow in either direction.

Still referring to FIG. 5, some of components illustrated in FIG. 5 and described herein may be decomposed into several parts. Some of the components illustrated in FIG. 5 may be composed into a single part manufactured in its entirety. For example, in some embodiments, cable gland head 501, nut 502, fastening section 503 and inner assembly 504 may be manufactured as a single integrated part. In some embodiments, outer casing 507 and O-ring 508 can be manufactured as part of the single integrated part. In some embodiments, inner assembly 504 may comprise several interconnecting parts, for example—a hollow casing, with an inner tube configured to connect to section 503. In some embodiments, O-ring 508 may be manufactured as part of the vent comprising gripping section 511.

Figure 6:
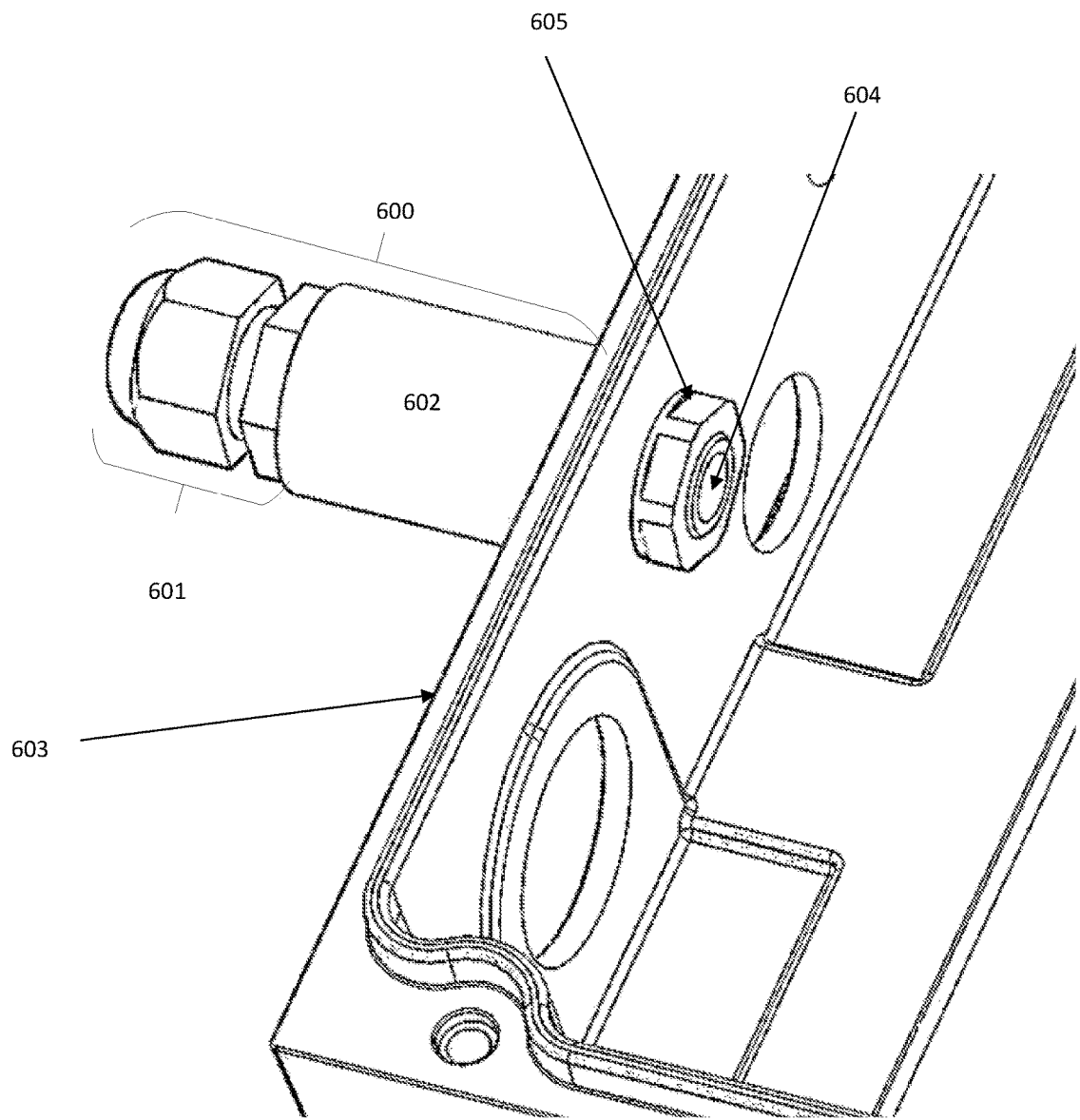
FIG. 6 illustrates interconnected hermeticity-testing elements according to various aspects of the present disclosure.

Reference is now made to FIG. 6, which illustrates an external view of a combined hermeticity-testing device similar to the one shown in FIG. 5. Adapter 600 may comprise the elements illustrated and discussed with regard to FIG. 5. Clearly visible are cable gland 601 and outer casing 602. Adapter 600 is fastened over a vent, which is not visible beneath outer casing 602. The bottom of fastening tube 604 is shown comprising threading, by which the vent is fastened to enclosure 603 by threading fastening tube 604 through enclosure nut 605. As mentioned above, in some embodiments the threading might not be necessary, if fastening tube can be inserted into enclosure 603 with sufficient tightness without it.

Figure 7:
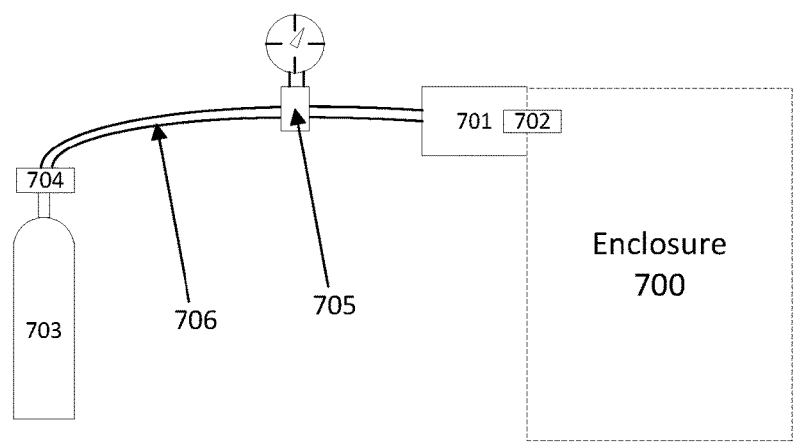
FIG. 7 illustrates interconnected hermeticity-testing elements according to various aspects of the present disclosure.

Reference is now made to FIG. 7, which shows a setup of a hermeticity-testing system according to an illustrative embodiment. In the embodiment illustrated in FIG. 7, the hermeticity of enclosure 700 is tested. Vent 702 may be fastened to enclosure 700, to maintain pressure equilibrium inside and outside the enclosure. Adapter 701 may be connected to tube 706 on one end, and may be hermetically fit over vent 702 on the other end. Valve 704 may control the airflow from canister 703 into tube 706, and sensor 705 may measure the air pressure inside tube 706. Sensor 705 may be an analog or digital sensor, configured to read air pressure and/or humidity in tube 706. It may be possible to determine the air pressure inside enclosure 700 by reading sensor 705, since under testing conditions enclosure 700 may be sealed to tube 706.

Figure 8:
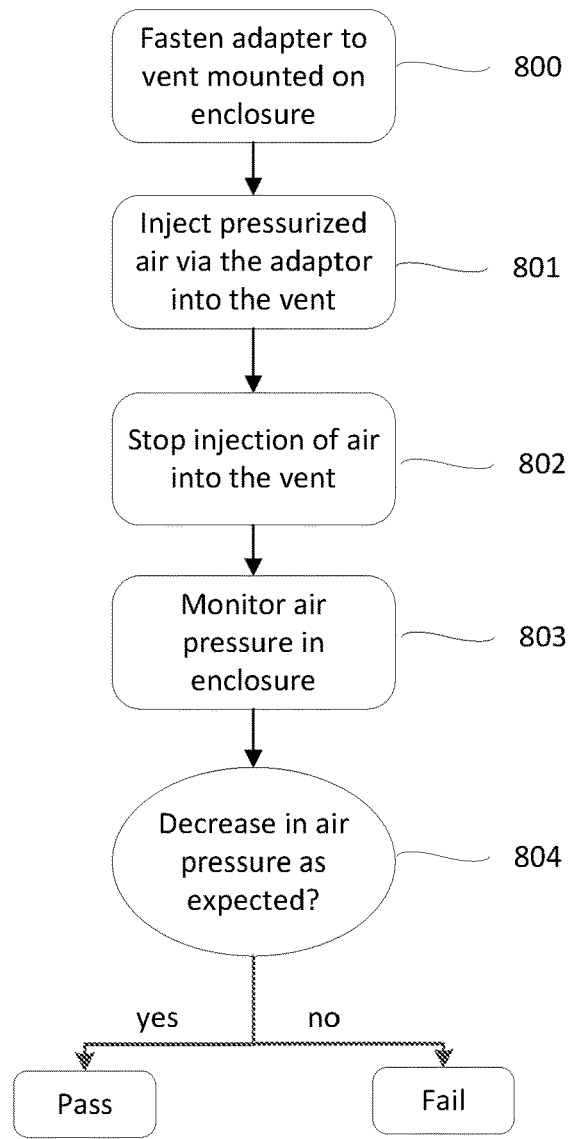
FIG. 8 illustrates a method for a hermeticity test according to various aspects of the present disclosure.

Reference is now made to FIG. 8, which illustrates a method for carrying out a hermeticity test according to illustrative embodiments. For example, the method depicted in FIG. 8 may be carried out using equipment similar to the equipment illustrated in FIG. 7. At step 800, an adapter (e.g. adapter 701) may be fastened to a vent (e.g., vent 702) mounted on an enclosure (e.g. enclosure 700). At step 801, pressurized air may be injected into the vent via the adapter. For example, valve 704 may be opened, allowing pressurized air to flow from canister 703, via tube 706 and adapter 701 into vent 702, and through vent 702 into enclosure 700. The pressurized air may pass through the vent filter (e.g. a membrane) of vent 702, or may pass through bypass air paths. The pressurized air may be at an appropriate pressure to avoid damaging the vent filter (e.g. for a vent filter rated at 500 mbar, the air may be injected at 100, 200, 300 or 400 mbar). In some embodiments, the air may be injected at close to the vent filter rating, and the hermeticity test may include testing the vent by injecting air at close to the vent filter rating. Sensor 705 may measure the air pressure in the enclosure, and when sensor 705 indicates sufficient air-pressure, at step 802 valve 704 may be closed, cutting off the flow of air into the enclosure. The desired level of air pressure triggering step 802 may greatly depend on the size of the enclosure being tested, as well as the sensitivity of the equipment and other factors. The level of air pressure at which the air flow is cut off may be, in some illustrative embodiments, several tens or hundreds of mbar. At step 803, the air pressure measured by a sensor (e.g. sensor 705) may be monitored over a short period of time (e.g. 30 seconds, 1 minute or five minutes). In some embodiments, continuous monitoring might not be carried out; rather, a single measurement may be taken at the end of the period of time. At the end of the period of time, at step 804, the air pressure may be measured and compared to a reference value to determine if the enclosure has passed or failed the hermeticity test. The reference value may be calculated as REF=$mbar_{before}$−MAX_LEAKAGE_RATE·Δt, where $mbar_{before}$ denotes the air pressure as measured at the end of step 802, MAX_LEAKAGE_RATE may denote the maximum allowable rate of reduction in air pressure, and Δt is the elapsed period of time. The maximum allowable rate of reduction in air pressure may depend on the size of the enclosure being tested, the material comprising the enclosure, and the desired level of hermeticity. The initial air pressure at the start of the hermeticity test may be an appropriate pressure to prevent damaging the vent filter, and may be close to the maximum rated air pressure of the vent filter, to test the vent filter tolerance as well. In some examples, the rate of change in air pressure may be compared to a reference rate to determine the degree of hermeticity of the enclosure. If the rate of change in air pressure is above the reference rate, the degree of hermeticity may be determined to be insufficient.

As a numerical example, the air pressure in an enclosure may be 300 mbar at the end of step 801. Given the size of the enclosure, a reduction of 3 mbar-per-minute or less may be a "passing" condition, and a reduction more than 3 mbar-per-minute may be a "failing" condition. Step 803 may include waiting three minutes and then measuring the air pressure in the enclosure via a sensor (e.g. sensor 705). Then if the measured air pressure is less than 291 mbar (300−3·3=291), the rate of the hermeticity test has failed, i.e. the enclosure may be insufficiently sealed, or the vent may be faulty. If the measured air pressure is 291 mbar or more, the test has passed, i.e. the enclosure is likely sufficiently sealed and the vent is likely not faulty.

Still referring to FIG. 8, the method described for hermeticity-sealing may be carried out manually or automatically. For example, one or more people may carry out all the steps by controlling valve 704, monitoring sensor 705, and manually carrying out calculations. In some embodiments, automatic machinery may control the air flow, with a digital sensor 705 transmitting measurements to a computing device (e.g. PC, server, microcontroller, ASIC, FPGA or more) configured to process the measurements and output the test result. In some embodiments, a plurality of hermeticity tests may be carried out simultaneously by several automatic machines, with real-time test results displayed on a user interface such as a computer monitor, TV screen, smart-phone application and the like. In some embodiments, monitoring the air pressure may be carried out using a digital pressure reader.

Figure 9:
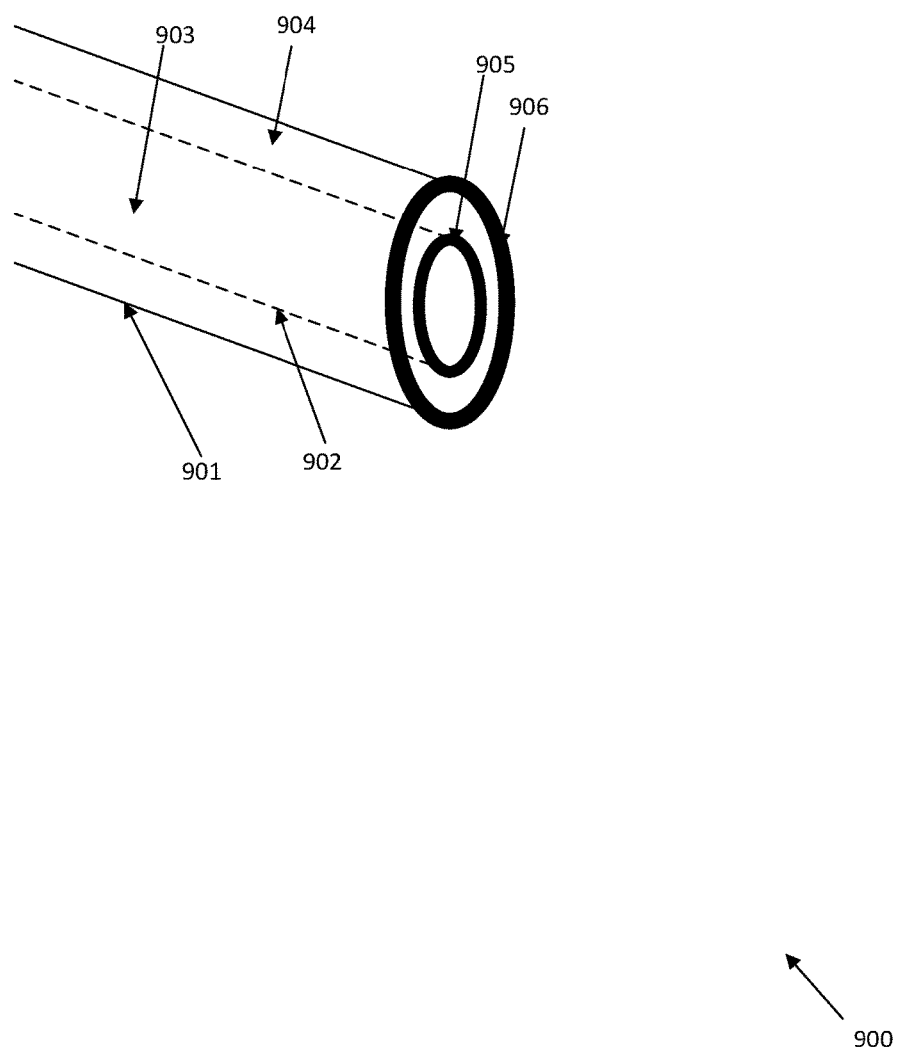
FIG. 9 illustrates a tube according to various aspects of the present disclosure.

Reference is now made to FIG. 9, which illustrates a tube that may be used to conduct a hermeticity test in conjunction with illustrative embodiments. Tube 900 may comprise outer tube 901 and inner tube 902. Airway 903 may be enclosed by inner tube 902 and may be appropriately sized to fit over a vent and inject gas (e.g. air, nitrogen or other gases) through an appropriately sized vent. Inner seal 905 may be attached at an end of inner tube 902, and may comprise a sealing device, for example, an O-ring or sealing pad. Outer seal 906 may be attached at an end of outer tube 901, and may comprise a sealing device, for example, an O-ring or sealing pad. Chamber 904 may be formed between inner tube 902 and outer tube 901. A vacuum pump may be connected at an end of pipe 900 and may remove gases from chamber 904 to form a vacuum chamber. Inner seal 905 and outer seal 906 may be designed to fit tightly against an enclosure and form a hermetic seal against the enclosure when chamber 904 is either vacuumed and/or pressurized. Tube 900 may enable hermeticity tests for enclosures comprising vents which might not be appropriately designed to fit adapters described herein (e.g. adapters 110, 210 and 701, from FIGS. 1, 2 and 7, respectively). In some embodiments, tube 900 may be coupled to an adapter similar to disclosed embodiments for sealing against an enclosure, with inner seal 905 and outer seal 906 comprising part of the adapter.

Figure 10:
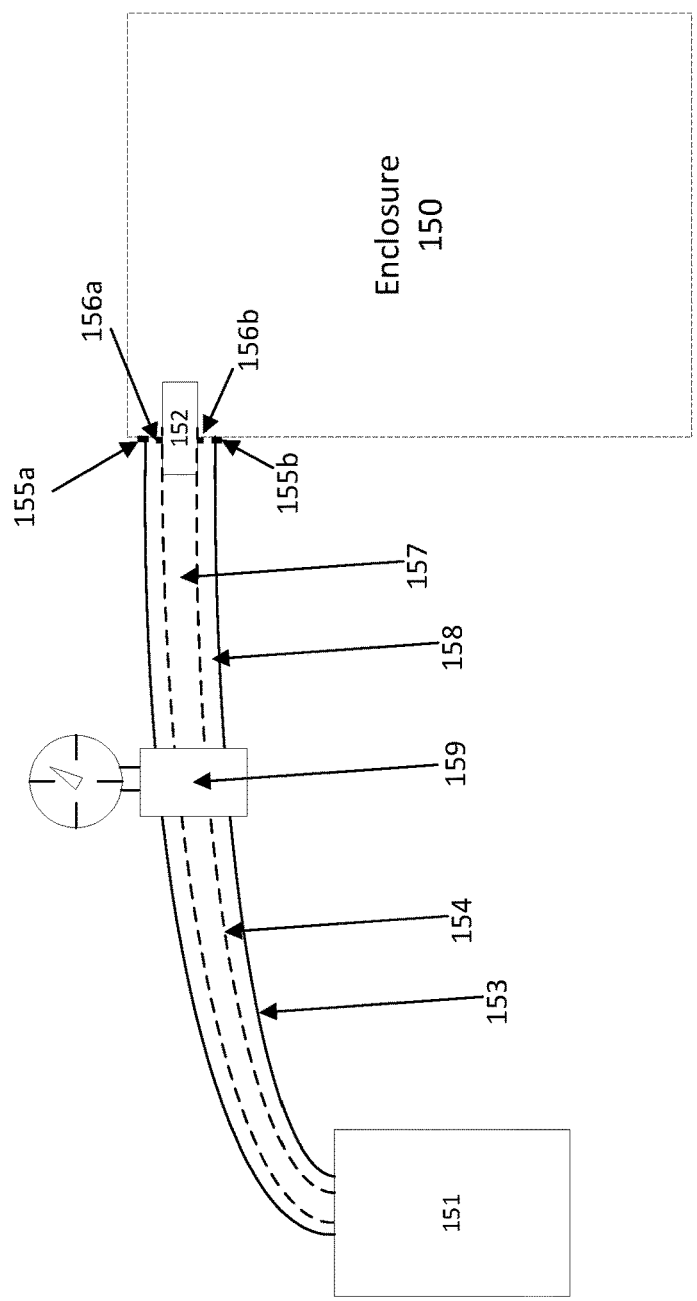
FIG. 10 illustrates interconnected hermeticity-testing elements according to various aspects of the present disclosure.

Reference is now made to FIG. 10, which shows a setup of a hermeticity-testing system according to an illustrative embodiment. In the embodiment illustrated in FIG. 10, the hermeticity of enclosure 150 is tested. Vent 152 may be fastened to enclosure 700, to maintain pressure equilibrium inside and outside the enclosure. Vent 152 may be similar to or the same as vents described herein (e.g. vents 300 and 400 from FIGS. 3 and 4, respectively). Vent 152 may also be a vent which might not be designed to fit to an adapter described herein. Outer tube 153 and inner tube 154 may be similar or the same as outer tube 901 and inner tube 902, respectively, as described in FIG. 9. Airway 157 may be similar to or the same as airway 903 from FIG. 9, and chamber 158 may be similar to or the same as chamber 904. Inner tube 154 and outer tube 153 may be collectively referred to as "tube 160" (not explicitly denoted in FIG. 10 for clarity reasons). Tube 160 may be connected at one end to compressor/pump 151 and coupled at one end to vent 152 and enclosure 150. Compressor/pump 151 may vacuum gases from chamber 158, forming a vacuum chamber, and may inject pressurized gas into inner tube 154. Sensor 159 may measure air pressure inside inner tube 154. Sensor 159 may be an analog or digital sensor, configured to read air pressure and/or humidity in inner tube 154. It may be possible to determine the air pressure inside enclosure 150 by reading sensor 159, since under testing conditions enclosure 150 may be sealed to inner tube 154. Outer seal sections 155a and 155b may be sections of an outer seal (e.g. an O-ring or a sealing pad) which may be similar to or the same as outer seal 906 of FIG. 9. Inner seal sections 156a and 156b may be sections of an inner seal (e.g. an O-ring or a sealing pad) which may be similar to or the same as inner seal 905 of FIG. 9. If compressor/pump 151 vacuums chamber 158, outer seal sections 155a and 155b and inner seal sections 156a and 156b may be tightly pressed against enclosure 150 and may form a hermetic seal against enclosure 150.

Figure 11:
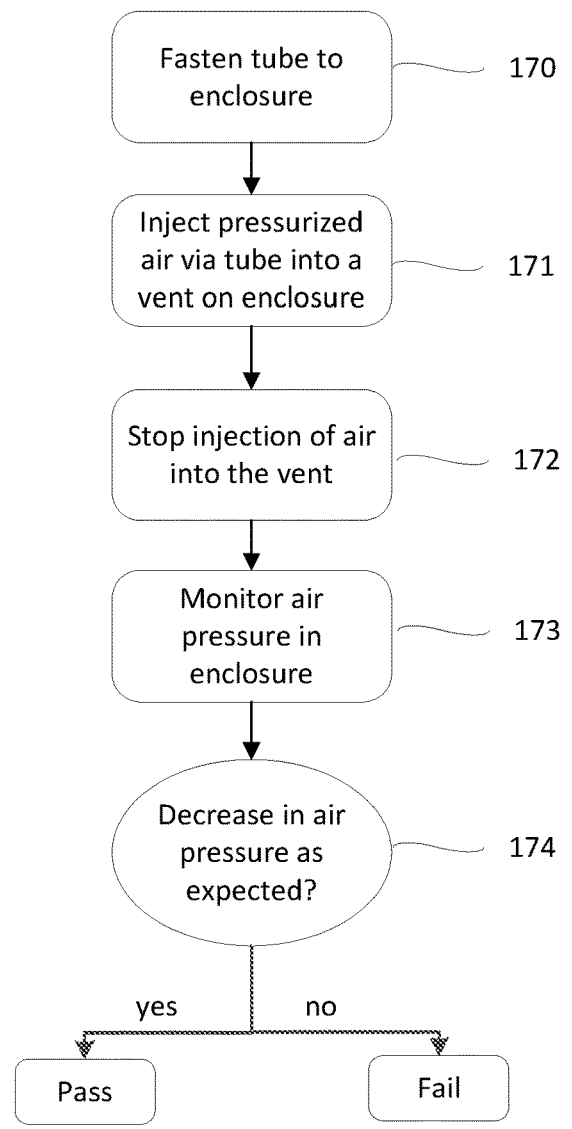
FIG. 11 illustrates a method for a hermeticity test according to various aspects of the present disclosure.

Reference is now made to FIG. 11, which illustrates a method for carrying out a hermeticity test according to an illustrative embodiment. For example, the method depicted in FIG. 11 may be carried out using equipment similar to the equipment illustrated in FIG. 10. At step 170, a tube (e.g. tube 900 of FIG. 9, or the combination of tubes 153 and 154 or FIG. 10) may be fastened to an enclosure (e.g. enclosure 150). The tube may comprise an inner tube and an outer tube, with a chamber (e.g. chamber 903 of FIG. 9) formed between the inner tube and the outer tube. The inner tube (e.g. inner tube 905 of FIG. 9) may fit over a vent fastened to the exterior of the enclosure (e.g. enclosure 150) and may be configured to maintain thermal or air-pressure equilibrium inside the enclosure. Fastening a tube to the enclosure may comprise vacuuming the chamber, using a vacuum pump (e.g. air compressor/vacuum pump 151 of FIG. 10) and/or using a pressure pump. At step 171, pressurized air may be injected through the inner tube into the vent and into the enclosure and/or taken out of the interior of the enclosure. The change of the pressure differential over time can be measured to check both the vent membrane (e.g., Gortex™ or other micro-porous material) as well as the sealing of the enclosure. For example, air compressor/vacuum pump 151 may have a setting configured to inject pressurized air through inner tube 154 while maintaining a vacuum chamber and/or pressure differential between inner tube 154 and outer tube 153. Sensor 159 may measure the air pressure in enclosure 150, and when sensor 159 indicates sufficient air-pressure, at step 172, air compressor/vacuum pump 151 may operate to cut off the flow of air into and/or out of the enclosure. The desired level of air pressure/vacuum triggering step 172 may greatly depend on the size of the enclosure being tested, as well as the sensitivity of the equipment and other factors. The level of air pressure at which the air flow is cut off may be, in some illustrative embodiments, several tens or hundreds of mbar. At step 173, the air pressure measured by a sensor (e.g. sensor 159) may be monitored over a short period of time (e.g. 30 seconds, 1 minute or five minutes). In some embodiments, continuous monitoring might not be carried out; rather, a single measurement may be taken at the end of the period of time. At the end of the period of time, at step 174, the air pressure may be measured and compared to a reference value to determine if the enclosure has passed or failed the hermeticity test. Step 174 may be similar to or the same as step 804 of FIG. 8

In operation, an enclosure (e.g. enclosure 700 or enclosure 150) may contain various electronic components such as photovoltaic (PV) electronic components including PV direct-current to alternating-current (DC-to-AC) inverters, PV direct-current to direct-current (DC-to-DC) converters, PV combiner boxes, PV safety devices (e.g. residual current detectors), PV maximizers, PV controllers, and other PV related electronics. The PV electronic components may themselves include sensors such as temperature, humidity, and pressure sensors (e.g., barometric and gas pressure sensors). The sensors may be hooked up to a central controller which may be in communication with external control mechanisms through a network such as a WiFi network or the Internet. A technician may be notified when the hermetic seal in any one of the PV electronic component enclosure becomes damaged. For example, the hermetic seal may be established at the factory with a preloaded pressure. The pressure in the enclosure may be achieved using any suitable gas such as air and/or nitrogen. The pressure in the enclosure may be maintained as the products are installed in the field and reported to the installer. This pressure can also be tracked in relation to temperature, barometric pressure, and enclosure pressure. In the event that the pressure decreases, this can be reported to an installer as a potential loss of hermeticity. The installer can also periodically check hermeticity by increasing pressure in the enclosure and monitoring the resulting pressure curves as the pressure dissipates above certain levels. Further, the PV electronics which measure pressure may indicate a potential failure because an enclosure lost a hermetic seal.

Figure 12:
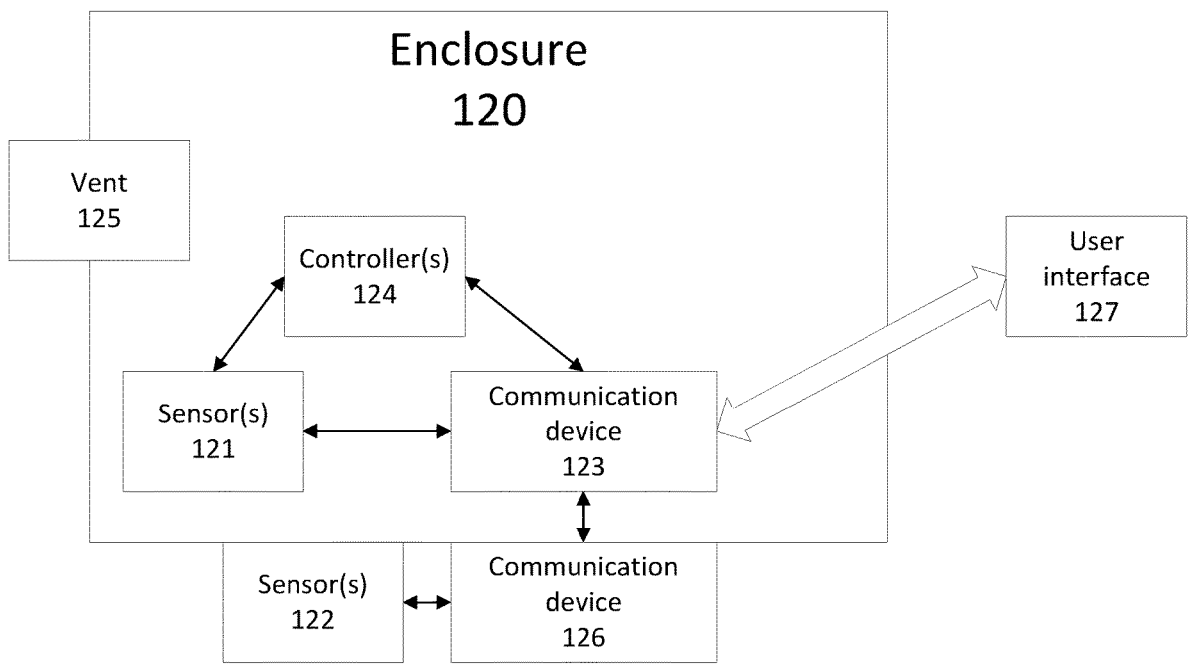
FIG. 12 illustrates a system for hermeticity monitoring and/or testing according to various aspects of the present disclosure.

Reference is now made to FIG. 12, which illustrates a system for monitoring enclosure operating conditions according to illustrative embodiments. Vent 125 may be fastened to enclosure 120 and may be configured to maintain thermal or air-pressure equilibrium inside enclosure 120. Sensor(s) 121 may be deployed inside enclosure 120. Sensor(s) 121 may comprise temperature, humidity or air pressure sensors (e.g., barometric and gas pressure sensors). Communication device 123 may be communicatively coupled to sensor(s) 121 and one or more controller(s) 124. The controller(s) 124 may be variously configured. The controller(s) 124 may be hardware, logic circuits, processor(s) (e.g., microprocessors, signal processors, and/or micro controllers) and/or may be implemented via software. The controller(s) 124 may include an A/D converter on one or more ports for interfacing to the sensor(s) 121 and/or communication device 123. The controller(s) 18 may also be implemented as one or more application-specific integrated circuits (ASICs) and may also include sensor(s) 121 integrated into the ASIC(s). In some embodiments, sensor(s) 122 may be deployed outside enclosure 120 and may comprise temperature, humidity or air pressure sensors (e.g., barometric and gas pressure sensors). Communication device 126 may be communicatively coupled to sensor(s) 122 and communication device 123. In some embodiments, physical parameters such as temperature, humidity and/or air pressure may be measured inside the device by sensor(s) 121 and outside the device by sensor(s) 122. Communication device 126 may communicate the measurements of sensor(s) 122 to communication device 123 via an appropriate method, e.g. wireless technologies such as ZigBee or WiFi. Communication device 123 may transfer the measurements of communication device 126 to controller(s) 124. Controller(s) 124 may further receive measurements from sensor(s) 121 for comparing to the measurements of sensor(s) 122, Controller(s) 124 may receive the measurements of sensor(s) 121 directly from sensor(s) 121, or via communication device(s) 123. Upon detection of a failure condition (e.g. the difference between the measurements of sensor(s) 122 and sensor(s) 121 are above a certain threshold), controller(s) 124 may configure communication device 123 to update user interface 127. Further, moisture sensors may be included in the electronics in the enclosure to determine moisture intrusion via a seal failure or membrane failure (e.g., Gortex™ membrane) in the vent.

User interface may comprise external devices and/or networks. For example, in certain embodiments, communication device 123 may be coupled to a wired and/or wireless network(s)/Internet/Intranet, and/or any number of end user device(s) such as a computer, smart phone, tablet and/or other devices such as servers which may be located at a network operations center and/or monitoring center. These devices may be utilized to generate a warning of a dangerous condition, determine when a dangerous condition is probable, detect the type of dangerous condition and/or take action to degrade or turn off certain portions a system enclosed in enclosure 120. These warnings can be audio and/or visual. They may, for example, be a beep, tone, siren, LED, and/or high lumen LED.

In case of a dangerous condition, a system installer or maintainer may physically inspect enclosure 120 for damage. Warnings generated by the system described herein may be indicative of a damaged enclosure caused by weather, tampering or faulty manufacturing. To verify system warnings, a system maintainer may carry out a hermeticity test such as described herein (e.g. the methods described in FIGS. 8 and 11).

In some embodiments, a system maintainer may periodically test hermeticity of field-deployed enclosed electronics using illustrative method disclosed herein. Hermeticity tests may be regular parts of system maintenance, and may be carried out even without indications of a dangerous or irregular condition. For example, a system maintainer may periodically (e.g. once every 6 months, once a year or once every two years) carry out a hermeticity test according to exemplary embodiments (e.g. the method described in FIG. 8 or the method described in FIG. 11) using a portable testing kit featuring elements similar to or the same as the elements shown in exemplary testing systems (e.g. the systems shown in FIGS. 7 and 10).

Referring again to FIG. 12, in some embodiments, enclosure 120 may be a hermetically sealed enclosure. For example, enclosure 120 may be desired to be perfectly airtight, with no vent maintaining equilibrium. In some embodiments, external measurements might not be utilized, and sensor(s) 122 and communication device 126 might not be necessary. Sensor(s) 121 may measure internal parameters such as temperature, humidity and/or air pressure. Controller(s) 124 may receive measurements from sensor(s) 121 and may compare them to reference values to determine a faulty condition. In case of a faulty condition, controller(s) 124 may take appropriate action, for example, shutting down electronics enclosed in enclosure 120 and/or operating communication device 123 to report the faulty condition to user interface 127. Vent 125 may be generally sealed, with a seal removable for testing hermeticity in case of a potentially faulty condition or according to a regular maintenance schedule, in accordance with embodiments disclosed herein.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. An apparatus comprising:
an adapter configured to connect to a ventilation plug, the adapter comprising:
an outer casing comprising an inner wall;
an inner assembly, bounded by the inner wall and comprising a cavity, wherein the cavity is configured to hold a protrusion of the ventilation plug, and wherein the inner assembly comprises a plurality of ducts in a linear arrangement; and
an O-ring disposed around an edge of the inner wall;
wherein the adapter forms an airtight chamber when the outer casing is fit over the ventilation plug and the O-ring is compressed between the inner wall and a gripping section of the ventilation plug.

2. The apparatus of claim 1, wherein the outer casing comprises a cylindrical outer casing.

3. The apparatus of claim 1, wherein the outer casing comprises a smooth outer casing.

4. The apparatus of claim 1, wherein the adapter makes a clicking sound when the ventilation plug is properly inserted into the adapter.

5. The apparatus of claim 1, wherein the adapter further comprises an outer lip shaped to receive a gripping section of the ventilation plug, wherein the adapter forms the airtight chamber when the outer casing is fit over the ventilation plug by sliding the outer lip over the gripping section of the ventilation plug and the cavity holds the protrusion of the ventilation plug.

6. The apparatus of claim 1 wherein the plurality of ducts is adapted to allow a gas to flow from the inner assembly to the chamber.

7. The apparatus of claim 1, wherein the inner assembly comprises at least one of: a first protrusion, a first cavity, or a first clasp configured to connect to a second protrusion, a second cavity, or a second clasp of a corresponding surface.

8. The apparatus of claim 1 and further comprising an outer lip adapted to be pressed against a wall of the ventilation plug.

9. The apparatus of claim 8, wherein the outer lip comprises a ring extending inwards.

10. The apparatus of claim 1, wherein the inner assembly further comprises a cable gland.

11. The apparatus of claim 10, wherein the cable gland comprises an opening for insertion of a pressure hose.

12. The apparatus of claim 11, wherein the pressure hose comprises an air tube.

13. The apparatus of claim 11, wherein the pressure hose comprises a gas tube.

14. The apparatus of claim 13, wherein the gas tube comprises a nitrogen tube.

15. A system comprising:
an adapter configured to connect to a ventilation plug, the adapter comprising:
an outer casing comprising an inner wall;
an inner assembly, bounded by the inner wall and comprising a cavity, wherein the cavity is configured to hold a protrusion of the ventilation plug; and
an O-ring disposed around an edge of the inner wall;
wherein the adapter forms an airtight chamber when the outer casing is fit over the ventilation plug and the O-ring is compressed between the inner wall and a gripping section of the ventilation plug, the ventilation plug comprising:
- a first section configured to connect to an enclosure;
- a second section configured to seal to the adapter;
- an opening configured to receive gas from the adapter;
- an airway through at least one of the first and second sections configured to pass gas received via the opening into the enclosure; and
- a vent filter comprising a membrane designed to allow bidirectional flow of gas while preventing moisture and/or dirt from passing through;
- a protrusion protruding from the second section and designed to fit into a corresponding cavity in the adapter; and
- at least one bypass airway allowing gas to bypass the vent filter.

16. The system of claim 15, wherein the first section comprises threading for screwing into corresponding threading on the enclosure.

17. The system of claim 15, wherein the vent filter comprises at least one of: a membrane, microporous PTFE filter, or fabric.

18. The system of claim 15, wherein the gas comprises one of air or nitrogen gas.

19. The system of claim 15, wherein the ventilation plug is rated to receive gas at a pressure of 100 to 1000 mbar.

20. The system of claim 19, wherein the ventilation plug is rated to receive gas at a pressure of 200 mbar.

* * * * *